E. L. HOFFMAN.
FUSELAGE PARACHUTE.
APPLICATION FILED MAY 5, 1921.
1,425,770.
Patented Aug. 15, 1922.
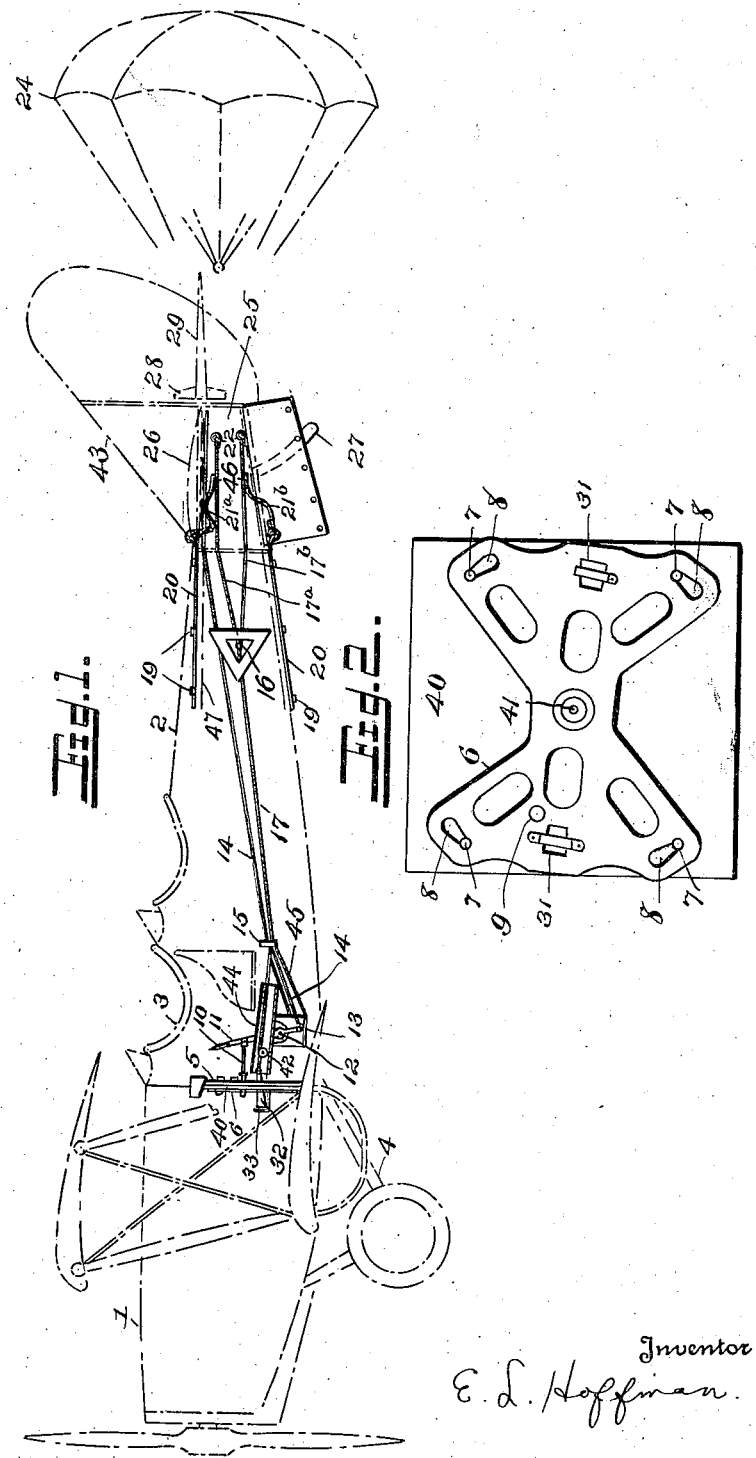
Inventor
E. L. Hoffman.
By Robert H. Young
Atto

UNITED STATES PATENT OFFICE.

EDWARD L. HOFFMAN, OF FORT SLOCUM, NEW YORK.

FUSELAGE PARACHUTE.

1,425,770.  Specification of Letters Patent.  Patented Aug. 15, 1922.

Application filed May 5, 1921. Serial No. 467,095.

*To all whom it may concern:*

Be it known that I, EDWARD L. HOFFMAN, a citizen of the United States, residing at Fort Slocum, in the county of Westchester and State of New York, have invented certain new and useful Improvements in Fuselage Parachutes, of which the following is a specification.

This invention relates to aircraft in general and more particularly to means whereby a portion of an aircraft body may be lowered in safety to the ground by means of a parachute.

I am aware that it is not new to provide an aircraft body which may be separated into two or more sections each of which may be lowered to the ground by means of a parachute. It has been proposed to provide such means separating the portions of the body of an aircraft to save the pilot or to save any valuable material from destruction in the event of such an emergency as a mechanical failure of the wings or the motor or in case of the outbreak of fire. My invention relates particularly to a novel means of separating the aircraft body into its separate sections and as to the location and means of storage of the parachute when not in operation.

In such devices of this nature as have been heretofore developed it has been noted that reliance has been placed upon a hand operated means for separating the fuselage into its sections and a separate means has been used to release the parachute at the proper time. Furthermore, it has been noted that in the patents so far granted in devices of this nature the parachute container has been found to be located in such a position as to render it very likely that upon the release thereof entanglement with the controls of the empennage or with the tail skid will almost inevitably result. It is the purpose of my invention to provide a means whereby the pilot may with a single motion of one lever put into operation all of the necessary functions for the separation of the fuselage sections and the opening of the parachute. Furthermore, it will be noted that I have provided compartments containing the parachute when inoperative in such a position as to guarantee against any possible entanglement upon release. The complete detailed description of my invention will be found in the accompanying specification in which, Figure 1 is a side elevation of an airplane embodying my invention with portions broken away to show the method of operation of the working parts;

Figure 2 is a detailed front view of the bulk head locking arrangement for joining the two sections of the fuselage.

Referring in detail to the structure shown in the accompanying drawings, 1 and 2 are the forward and rear sections, respectively, into which the fuselage or body of the aircraft is to be separated. These two sections are joined together at a point just forward of the pilot's cockpit 3 and immediately to the rear of the landing gear 4. The rear section is attached to the forward section by means of two metal bulk heads 5 and 40, bulk head 5 having a metal plate 6 rotatably mounted thereon at 41 and bolted to the bulk head 40 by means of bolts 7 in the ends of slots 8. These slots, as are shown in Figure 2, are restricted at one end sufficiently at the heads of the bolts 7 to prevent the separation of the two sections of the fuselage. The other ends of said slots are so enlarged as to permit these bolt heads to pass freely through them for the purpose of unlocking the two sections when it is so desired. At 9 in Figure 2 there is shown a slot for the reception of the locking means 10 adapted to prevent any undesired unlocking of the bulk head by accidental rotation of the plate 6. Locking member 10 as shown is attached to operating lever 11 which is arranged so as to be easily accessible to the pilot. Operating lever 11 is pivoted at 12 and is attached at its lower end 13 to a rip cord 14 which operates in the usual manner to rip open the parachute pack. The parachute 24, when inoperative, is located in the compartment 25 which forms the extreme rear end of the fuselage and, as shown, is clear of the horizontal stabilizer 26, is below the vertical fin 43, and provides for the release of the parachute at a point rearward of the tail skid 27, below the rudder controls, not shown, and at a point inwardly of the elevator controls 28 and 29. It will thus be clearly seen that no entanglement can result from the release of the parachute in view of the above description. In actual practice there have been provided two such parachute compartments and parachutes, one upon each side of the fuselage to even further minimize any accident due to the failure or entanglement of the parachute.

The parachute 24 is connected to the cables 22 at the loops shown. These cables are branched at 46 into two cables 21 a and b and 17 a and b, respectively. The branches 17 a and b are shown normally taut while the branches 21 a and b are sufficiently slacked to permit the complete operation of unlocking the bulk heads by cables 17 a and b before any of the strain is taken up by them. The cables 21 a and b are shown attached to metal plates 20 which are bolted to the longerons 47 by bolts 19. Two cables 17 a and b are shown as united at 16 to a single cable 17. 17 passes through a guide 15 and a tube 44, which is provided as a safety means to prevent any entangling, and runs over a pulley 42. The cable 17 is shown attached to a wedge 32 which is loosely held in position by a support 33. As will be clearly seen as tension is given to the cable 17, the wedge 32 will be pulled sharply toward the rear of the fuselage and the wedge will cause, by virtue of pressing against the edges of the slots 31, a counter clockwise rotation of the plate 6 around the point 41. This will operate to move the slots 8 into such a position that the bolts 7 will pass therethrough and permit the fuselage to separate into its two sections.

As shown, there is provided a protecting tube 45 to prevent the accidental pulling of the rip cord 14. The rip cord 14 passes also through the guide 15.

The operation of my device is as follows. When the pilot wishes to free himself from the forward end of the plane he pulls back upon the lever 11 thereby removing the locking piece 10 from the slot 9 and unlocking the rotatable plate 6. The same motion at the lower end of the lever 11 will have caused the rip cord 14 to have been pulled forward and will have ripped the cover of the pack or parachute container. The parachute upon opening will put great tension upon the cables 22 and through 17 a and b to the cable 17. This will cause the wedge 32 to be pulled sharply backward in such a manner as to cause the rotation of the plate 6 so as to permit the bolts 7 to pass through the slots 8, unlocking the fuselage section. It will be noted at this time that the elevator and rudder controls to be released are completely contained in the section 2. It is intended that all motor controls shall form a part of section 1 or that they shall have a slidably releasable connection with their counterparts in section 1. A shaft and sheave slidingly releasable aileron control will be made the subject matter of another application. After the unlocking motion is completed the cables 21 a and b take up the strain of the weight of the rear section of the fuselage and its contents and will permit the same to be lowered gently to the ground.

It is to be noted particularly that the pilot by a single motion can put into operation all the means for unlocking the rotating plate and releasing the parachute, which automatically provides for the separation of the aircraft body into its two sections. In devices of a similar nature the means for normally retaining the two sections together would require so much effort and attention on the part of the pilot as to render it improbable that he could succeed in separating the sections before the emergency, either fire or mechanical failure, would cause his plane to crash or be burned up. It is further noted that due to the motion of the plane through the air that considerable strength would be required to operate any fuselage releasing means or to remove any bolts or similar means for normally holding the sections together, as will readily be seen. The parachute embodied in my invention will exert a tremendous force capable of operating any such releasing means. Tests have been carried out showing the complete practicability and certainty of functioning of the device embodied in my invention.

I claim:

1. In combination, in an aircraft body of a plurality of sections, means operably connecting said sections together, and means operable at the will of the pilot and operated by the resistance of the air to release said connecting means for the purpose described.

2. In combination, in an aircraft body of a plurality of sections, means operably connecting said sections together, and means operable at the will of the pilot and operated by the resistance of the air to automatically release said connecting means for the purpose described.

3. In combination, in an aircraft body of a plurality of separable sections, means operably connecting said separable sections together, and a parachute releasable at the will of the pilot for releasing said connecting means for the purpose described.

4. In combination, in an aircraft body of a plurality of separable sections, means operably connecting said separable sections together, a parachute releasable at the will of the pilot for releasing said connecting means for the purpose described, and means for releasing said parachute.

5. In combination, in an aircraft body of a plurality of separable sections, means operably connecting said separable sections together, and a parachute releasable at the will of the pilot for releasing said connecting means for the purpose described, said parachute being releasable at a point rearwardly of any entangling surfaces of said aircraft body.

6. In combination, in an aircraft body of a plurality of separable sections, means operably connecting said separable sections together, a parachute releasable at the will of the pilot for releasing said connecting means for the purpose described, and means for releasing the parachute, said parachute being releasable at a point rearwardly of any entangling surfaces of said aircraft body.

7. In combination, in an aircraft body of a plurality of separable sections, means operably connecting said separable sections together, a parachute releasable at the will of the pilot for releasing said connecting means for the purpose described, and means operably connecting the said parachute to said connection releasing means.

8. In combination, in an aircraft body of separable sections, means in one of said sections comprising a bulk head with a rotatable metal plate, and in the other section a bulk head provided with bolts normally connecting said sections together, and means operable at the will of the pilot for causing the rotation of said metal plate to release said connecting means.

9. In combination, in an aircraft body of separable sections, means in one of said sections comprising a bulk head with a rotatable metal plate, and in the other section a bulk head provided with bolts normally connecting said sections together, and wedge means operable at the will of the pilot for causing the rotation of said metal plate to release said connecting means.

10. In combination, in an aircraft body of separable sections, means in one of said sections comprising a bulk head with a rotatable metal plate, and in the other section a bulk head provided with bolts normally connecting said sections together, wedge means operable at the will of the pilot for causing the rotation of said metal plate to release said connecting means, and means operable at the will of the pilot for locking said metal plate against rotation.

11. In combination, in an aircraft body of separable sections, means in one of said sections comprising a bulk head with a rotatable metal plate, and in the other section a bulk head provided with bolts normally connecting said sections together, means operable at the will of the pilot for causing the rotation of said metal plate to release said connecting means, and a parachute for operating said rotating means.

12. In combination, in an aircraft body of separable sections, means in one of said sections comprising a bulk head with a rotatable metal plate, and in the other section a bulk head provided with bolts normally connecting said sections together, wedge means operable at the will of the pilot for causing the rotation of said metal plate to release said connecting means, and a parachute for operating said wedge means in such a manner as to rotate said metal plate.

13. In combination, in an aircraft body of separable sections, means in one of said sections comprising a bulk head with a rotatable metal plate, and in the other section a bulk head provided with bolts normally connecting said sections together, wedge means operable at the will of the pilot for causing the rotation of said metal plate to release said connecting means, a parachute for operating said wedge means in such a manner as to rotate said metal plate, and means operable at the will of the pilot for locking said metal plate against rotation.

14. In combination, in an aircraft body of separable sections, means operably connecting said sections, and means in one of said sections for releasing said operably connecting means, a parachute for operating said releasing means, and means connecting said parachute to the separable section to provide for the gradual descent of said section for the purpose described.

15. In combination, in an aircraft body of separable sections, means operably connecting said sections, and means in one of said sections for releasing said operably connecting means, a parachute for operating said releasing means, and means connecting said parachute to the separable section to provide for the gradual descent of said section for the purpose described, said last named means coming into operation only after the function of the releasing means has been completed.

In testimony whereof I have affixed my signature.

EDWARD L. HOFFMAN.